United States Patent
Jiang

(10) Patent No.: US 7,985,163 B2
(45) Date of Patent: Jul. 26, 2011

(54) ADAPTIVE CLUTCH TORQUE CONTROL FOR A POWERSHIFT TRANSMISSION

(75) Inventor: Hong Jiang, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 893 days.

(21) Appl. No.: 11/955,677

(22) Filed: Dec. 13, 2007

(65) Prior Publication Data
US 2009/0156356 A1 Jun. 18, 2009

(51) Int. Cl.
*F16D 43/24* (2006.01)
(52) U.S. Cl. .................................. 477/180; 192/103 C
(58) Field of Classification Search .................. None
See application file for complete search history.

(56) References Cited

U.S. PATENT DOCUMENTS

| | | | | |
|---|---|---|---|---|
| 6,112,870 A | * | 9/2000 | Fukumoto | 192/3.58 |
| 6,711,964 B2 | * | 3/2004 | Ochi et al. | 74/337 |
| 2003/0089569 A1 | * | 5/2003 | Antonov et al. | 192/48.92 |

* cited by examiner

*Primary Examiner* — Sherry Estremsky
(74) *Attorney, Agent, or Firm* — David B. Kelley; MacMillan, Sobanski & Todd, LLC

(57) ABSTRACT

A method for controlling an input clutch of a vehicle transmission that includes an output driveably connected to the input clutch includes increasing the torque capacity of the input clutch, determining a reference acceleration of the output, determining a current acceleration of the output after the reference acceleration is determined, if a difference between the reference acceleration of the output and the current acceleration of the output is equal to or greater than a reference change in acceleration of the output, determining a desired input clutch torque, and adjusting the input clutch to produce the desired input clutch torque.

21 Claims, 2 Drawing Sheets

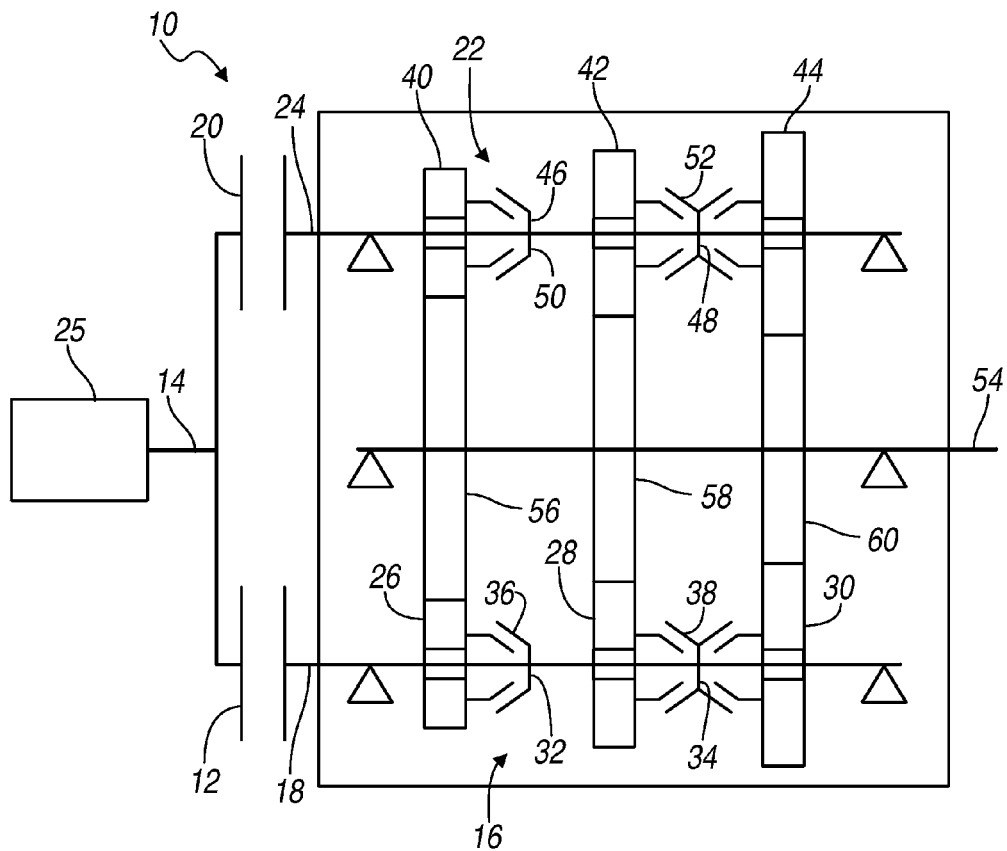
FIG. 1
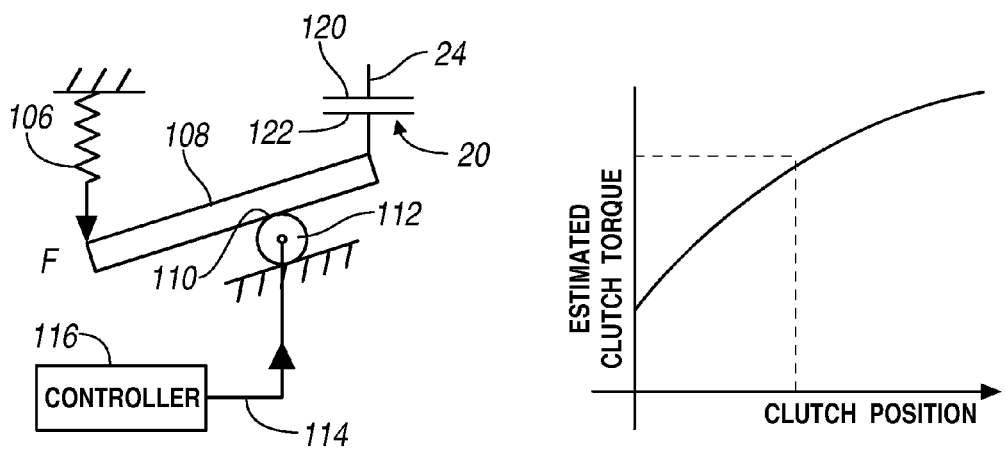
FIG. 4
FIG. 5

ADAPTIVE CLUTCH TORQUE CONTROL FOR A POWERSHIFT TRANSMISSION

BACKGROUND OF THE INVENTION

1. Field of the Invention

This invention relates generally to a transmission for a motor vehicle, and, more particularly, to adaptively controlling the magnitude of torque transmitted by an input clutch.

2. Description of the Prior Art

A powershift transmission is a geared mechanism employing two input clutches used to produce multiple gear ratios in forward drive and reverse drive. It transmits power continuously using synchronized clutch-to-clutch shifts.

The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

The magnitude of torque being transmitted through each input clutch of a powershift transmission, specially such a transmission having dry input clutches, can vary in a wide range when launching the vehicle from rest and while making gear ratio changes because the coefficient of dry friction of the clutch changes with variations in clutch temperature. Therefore, extensive adaptive control of the input clutch torque is required to achieve consistent operating feel to the driver during vehicle launches and gear shifts.

Engine torque is often used as feedback variable to control adaptively input clutch torque to the changing operating environment of the input clutches and vehicle. Experience has shown, however, that the variation of clutch torque can be equal to or greater than the error in estimating the magnitude of torque being produced by the engine, thereby adversely affecting the quality of the control of input clutch torque when engine torque is the control variable. Due to the engine torque estimation error currently available, input clutch torque varies in an unacceptably wide range and fails to produce a consistent vehicle launch and shift feel.

A need exists in the industry for a reliable, consistent technique for controlling input clutch torque in a powershift transmission that accounts for changing vehicle conditions and operating parameters.

SUMMARY OF THE INVENTION

A method for controlling an input clutch of a vehicle transmission that includes an output driveably connected to the input clutch includes increasing the torque capacity of the input clutch, determining a reference acceleration of the output, determining a current acceleration of the output after the reference acceleration is determined, if a difference between the reference acceleration of the output and the current acceleration of the output is equal to or greater than a reference change in acceleration of the output, determining a desired input clutch torque, and adjusting the input clutch to produce the desired input clutch torque.

The method produces a major improvement in the shift feel consistency of the transmission, and it can be used as an enhancement to an engine torque based input clutch adaptive control strategy.

The strategy produces a reliable, consistent technique for controlling input clutch torque in a powershift transmission by accounting for changing vehicle conditions and operating parameters such as changes in road slope, vehicle loading, and the coefficient of friction of the input clutch due to heat produced by slipping the clutch during a gear ratio change or while launching the vehicle.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a schematic diagram of a dual input clutch of a powershift transmission;

FIG. 4 is a schematic diagram showing a technique for adjusting the torque capacity of the input clutch; and FIG. 5 is a graph of a function relating input clutch position to the estimated input clutch torque.

DESCRIPTION OF THE PREFERRED EMBODIMENT

Figure 2:
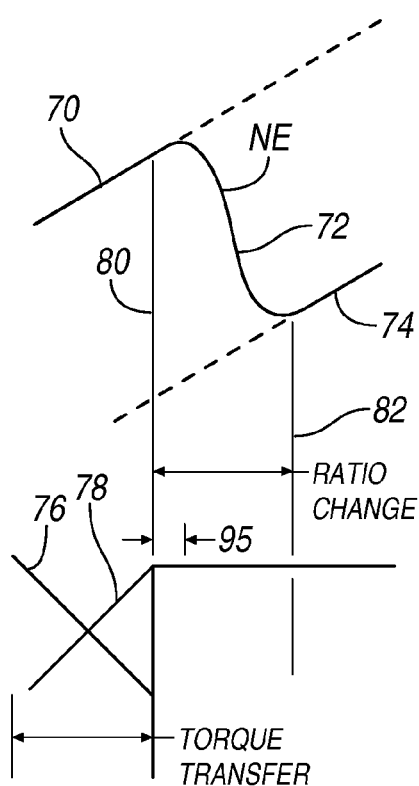
FIG. 2 is graph representing the variation of engine speed and input clutch torque during a 1-2 upshift of a powershift transmission.

Referring now to the drawings, there is illustrated in FIG. 1 a powershift transmission 10 that includes a first input clutch 12, which selective connects the input 14 of the transmission to the even-numbered gears 16 associated with a first layshaft 18, and a second input clutch 20, which selective connects the input 14 to the odd-numbered gears 22 associated with a second layshaft 24. Input 14 is driveably connected to an engine 25.

Layshaft 18 supports pinions 26, 28, 30, which are each journalled on layshaft 18, and couplers 32, 34, which are secured to layshaft 18. Pinions 26, 28, 30 are associated respectively with the first, third and fifth gears. Coupler 32 includes a sleeve 36, which can be moved leftward to engage pinion 26 and to driveably connect pinion 26 to layshaft 18. Coupler 34 includes a sleeve 38, which can be moved leftward to engage pinion 28 and to driveably connect pinion 28 to layshaft 18 and can be moved rightward to engage pinion 30 and to driveably connect pinion 30 to layshaft 18.

Layshaft 24 supports pinions 40, 42, 44, which are each journalled on layshaft 24, and couplers 46, 48, which are secured to layshaft 24. Pinions 40, 42, 44 are associated respectively with the second, fourth and sixth gears. Coupler 46 includes a sleeve 50, which can be moved leftward to engage pinion 40 and to driveably connect pinion 40 to layshaft 24. Coupler 48 includes a sleeve 52, which can be moved leftward to engage pinion 42 and driveably connect pinion 42 to layshaft 24 and can be moved rightward to engage pinion 44 and driveably connect pinion 44 to layshaft 24.

Transmission output 54 supports gears 56, 58, 60, which are each secured to output shaft 54. Gear 56 meshes with pinions 26 and 40. Gear 58 meshes with pinions 28 and 42. Gear 60 meshes with pinions 30 and 44.

Couplers 32, 34, 46 and 48 may be synchronizers, or dog clutches or a combination of these.

Transmission 10 produces first gear when coupler 32 driveably connects pinion 26 to layshaft 18, input clutch 20 is disengaged, and input clutch 12 is engaged or slipping. The transmission produces an upshift from first gear to second gear upon disengaging the off-going input clutch 12, actuating coupler 50 to driveably connect pinion 40 to layshaft 24, and engaging the oncoming input clutch 20.

FIG. 2 illustrates the change over time of transmission and engine variables during an upshift of transmission 10 from first gear to second gear. Graph 70 represents the speed of the engine 25 and input shaft 14 while transmission 10 operates in first gear. Graph 72 represents engine speed (NE) during a ratio change to second gear. Graph 74 represents the speed of input 24, i.e., the speed of output shaft 54 speed multiplied by the second gear ratio, while the transmission operates in second gear. Graph 76 represents torque transmitted by the off-going input clutch 12. Graph 78 represents the torque variation of the on-coming input clutch 20 during the torque transfer portion and ratio change portion of the gear shift. A torque transfer phase of the gear shift occurs while clutch 12 is being disengaged 76 causing the torque it transmits to decline, and while clutch 20 is being engaged 78 causing the torque it transmits to increase. When clutch 20 is starting to carry the engine torque and to decrease the engine speed at 80, the torque transfer phase ends, the gear ratio changes begins, the torque of input clutch 20 is relatively constant, and engine speed decreases 72 until the gear ratio change is completed at 82, whereupon engine speed and the speed of layshaft 24 are substantially equal and increasing as the vehicle accelerates.

Oncoming input clutch 20 is used to decrease engine speed during the gear ratio change portion 80-82 of the gear shift, which portion may last between 300 and 500 msec. Several parameters may change while executing the gear shift, including the slope of the roadway on which the vehicle is operating and the temperature of the on-coming input clutch 20 due to its slipping in the torque transfer portion of the gear shift, and the coefficient of friction of the clutch.

The control method adaptively accounts for these changes during the ratio change mode of a gear shift and a vehicle launch by relying on the rate of change in speed of the output shaft 54, or that of the driven wheels of the vehicle. Since the transmission output torque is determined by using input clutch torque, not engine torque, the input clutch torque is equal to vehicle inertia multiplied by the acceleration of the output shaft 54, $$T_{CL}=I_V*[dNO/dt]/GR \quad (1)$$

wherein, $T_{CL}$ is the magnitude of torque transmitted by the on-coming input clutch 20, $I_V$ is the vehicle inertia, a constant; NO is speed of output 54; GR is the current gear ratio; and t is time.

Because of the short duration of the ratio change of the gear shift, a period of about 300-500 msec, neither vehicle inertia nor vehicle load, due to a road grade or hill, will change much during the gear ratio change portion 80-82 of the gear shift. However, the coefficient of friction of a dry input clutch 12, 20, will change rapidly by a large percentage due to a temperature increase. For example, the coefficient of friction a dry input clutch can vary between 0.20 and 0.40.

Figure 3:
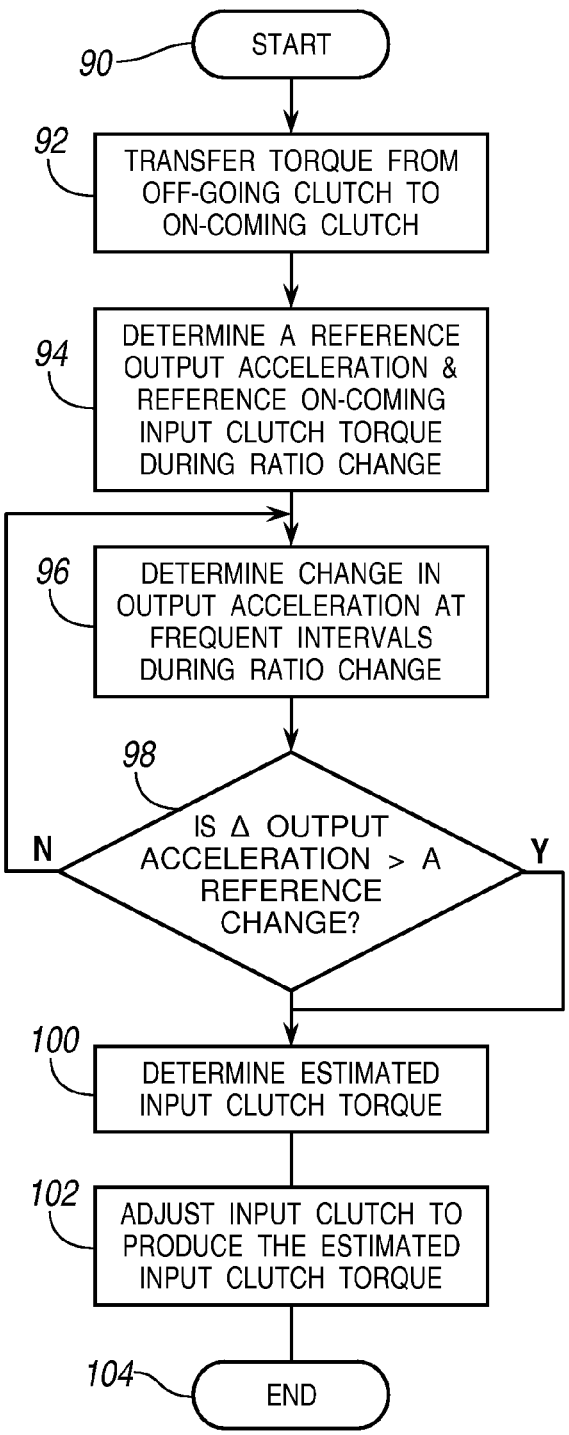
FIG. 3 is logic flow diagram of a control algorithm.

To account for changing operating conditions including the coefficient of friction of each input clutch 12, 20 during a gear shift, the torque capacity of the on-coming input clutch 20 is controlled by an algorithm, whose steps are illustrated in FIG. 3. After a gear shift is initiated at 90, e.g. an upshift from first gear to second gear, torque is transferred from the off-going input clutch 14 to the on-coming input clutch 20 at step 92.

At step 94, a reference acceleration of the output 54 is determined while clutch 20 is starting to carry the engine torque and the torque of clutch 20 is relatively constant at an initial torque after the torque transfer phase ends at 80 and during a brief period 95 of the ratio change portion of the gear shift. Equation (1) is used with the determined reference acceleration of the output 54 and the vehicle inertia to determine a reference torque capacity of clutch 20 while the gear ratio is a constant. The second gear ratio is used for a 1-2 shift.

Thereafter, during each execution of the algorithm, at about 10 msec. intervals, a change in acceleration of the output 54 is determined at step 96.

A test is performed at step 98 to determine whether the change in acceleration of the output is greater than a calibrated reference acceleration change. If the result of test 98 is logically false, control passes to step 96.

If the result of test 98 is logically true, at step 100, an estimated input clutch torque $T_{CL\ estimated}$ is determined as the product of the reference input clutch torque $T_{CL\ reference}$ multiplied by the current output acceleration divided by the reference output acceleration, as shown in Equation (2).

$$T_{CL\ estimated} = T_{CL\ reference} \times \frac{\text{current output acceleration}}{\text{reference output acceleration}} \quad (2)$$

Alternately, if the result of test 98 is logically true, equation (1) is used with the current acceleration of the output and vehicle inertia to determine the estimated input clutch torque $T_{CL\ estimated}$ at step 100.

Then the position of the on-coming input clutch 20 is adjusted as described with reference to FIG. 4, such that clutch 20 produces the estimated input clutch torque that was determined at step 100. The algorithm is exited at step 104

FIG. 4 illustrates a technique for adjusting the position of the on-coming input clutch 20, i.e., the relative location of the clutch plates that determine the torque capacity of clutch 20 when that clutch is a dry clutch. A constant force F, such as the force of a compression spring 106 may be applied to a lever 108, which pivots about a fulcrum 110, whose position changes with the position of a stepper motor 112. Motor 112 moves incrementally along the length of lever 108 in response to an electric control command, in the form of a pulse 114 applied to the motor 112 by a controller 116.

Controller 116 uses the estimated input clutch torque and a function such as that shown in FIG. 5 relating the estimated on-coming input clutch torque to the position of the input clutch 20. When the estimated input clutch torque is determined at step 100, controller 116 determines the position of the fulcrum that corresponds to the estimated input clutch torque and issues a pulse command 114 to motor 112, which changes the position of the fulcrum 110. These actions adjust the position of, and force of contact between the plates 120, 122 of clutch 20. This adjustment of the clutch position produces a change in the torque capacity of the on-coming input clutch to the estimated input clutch torque.

The input clutches 12, 20 may be dry clutches or wet clutches. When the input clutches 12, 20 are wet clutches, the magnitude of control pressure applied to the clutches is changed to produce the desired clutch torque.

The strategy can also be applied to control a vehicle launch using one input clutch, e.g., clutch 14 when the launch is performed in first gear. Preferably the vehicle launch is completed within about two seconds. The strategy always resets the base reference of the acceleration of output shaft speed if a large error is observed at step 98.

The adaptive control strategy uses the rate of change of output shaft speed or wheel speed, if available, to correct the input clutch torque for a given clutch position.

Throughout this description the control strategy is described with reference to a 1-2 upshift, but the control can be applied to any upshift or downshift that transmission 10 is able to perform, in forward drive, reverse drive or between forward and reverse drive. Therefore, the on-coming input clutch may be clutch 20 or clutch 12.

Throughout this description the control strategy is described with reference to determining the acceleration of the output shaft 54. But the control can be applied by determining, instead, the acceleration of any component that is driveably connected to output 54, such as one of the driven vehicle wheels, upon accounting for any speed ratio between the component and output 54.

In accordance with the provisions of the patent statutes, the preferred embodiment has been described. However, it should be noted that the alternate embodiments can be practiced otherwise than as specifically illustrated and described.

The invention claimed is:

1. A method for controlling an input clutch of a vehicle transmission that includes an output driveably connected to the input clutch, comprising the steps of:
   (a) increasing a torque capacity of the input clutch to an initial torque;
   (b) determining a reference acceleration of the output;
   (c) using the reference acceleration of the output to determine a reference input clutch torque;
   (d) determining a current acceleration of the output after the reference acceleration is determined;
   (e) using the current acceleration of the output, the reference acceleration of the output and the reference input clutch torque to determine an estimated input clutch torque; and
   (f) adjusting the input clutch to produce the estimated input clutch torque.

2. The method of claim 1 wherein step (b) further comprises the steps of:
   repetitively determining at frequent intervals a speed of the output;
   determining a difference between the speed of the output during a predetermined period between the intervals; and
   dividing the speed difference by the length of the period.

3. The method of claim 1 wherein step (a) further comprises the step of maintaining the torque capacity of the input clutch at the initial torque for a period during a ratio change portion of a gear shift.

4. The method of claim 1 wherein step (b) is performed while the torque capacity of the input clutch is relatively constant.

5. The method of claim 1 wherein step (c) further comprises the step of multiplying an inertia of the vehicle by the reference acceleration of the output.

6. The method of claim 1 wherein step (e) further comprises the step of multiplying the reference input clutch torque by the current output acceleration divided by the reference output acceleration.

7. The method of claim 1 wherein step (f) further comprises adjusting a position of the input clutch to produce the estimated input clutch torque.

8. The method of claim 1 wherein step (f) further comprises adjusting a pressure applied to the input clutch.

9. The method of claim 1 wherein step (f) further comprises the steps of:
   applying a substantially constant force to a lever that pivots about a fulcrum whose position changes;
   driveably connecting a plate of the input clutch to the lever; and
   changing the position of the fulcrum to a position at which the input clutch produces the desired clutch torque.

10. A method for controlling an input clutch of a vehicle transmission that includes an output driveably connected to the input clutch, comprising the steps of:
    (a) increasing a torque capacity of the input clutch to an initial torque;
    (b) determining a reference acceleration of the output;
    (c) determining a current acceleration of the output after the reference acceleration is determined;
    (d) if a difference between the reference acceleration of the output and the current acceleration of the output is equal to or greater than a reference change in acceleration of the output, determining a desired input clutch torque; and
    (e) adjusting the input clutch to produce the desired input clutch torque.

11. The method of claim 10 wherein step (a) further comprises the step of maintaining the torque capacity of the input clutch at the initial torque for a period during a ratio change portion of a gear shift.

12. The method of claim 10 wherein step (b) is performed while the torque capacity of the input clutch is relatively constant.

13. The method of claim 10 wherein determining the desired input clutch torque of step (d) further comprises the step of multiplying an inertia of the vehicle by the current acceleration of the output.

14. The method of claim 10 wherein determining the desired input clutch torque of step (d) further comprises the step further comprises the steps of:
    determining a reference input clutch torque from the product of the reference acceleration of the output multiplied by an inertia of the vehicle; and
    multiplying the reference input clutch torque by the current output acceleration divided by the reference output acceleration.

15. The method of claim 10 wherein step (e) further comprises adjusting a pressure applied to the input clutch.

16. The method of claim 10 wherein step (e) further comprises adjusting a position of the input clutch to produce the estimated input clutch torque.

17. The method of claim 10 wherein step (e) further comprises the steps of:
    applying a substantially constant force to a lever that pivots about a fulcrum whose position changes;
    driveably connecting a plate of the input clutch to the lever; and
    changing the position of the fulcrum to a position at which the input clutch produces the desired clutch torque.

18. The method of claim 10 wherein step (b) further comprises the steps of:

repetitively determining at frequent intervals a speed of the output;

determining a difference between the speed of the output at a beginning and an end of a predetermined period extending between at least two of the intervals; and dividing the speed difference by the length of the period.

19. A method for controlling an input clutch during a gear shift of a vehicle transmission that includes gearing and an output that is driveably connectable to an off-going input clutch and an on-coming input clutch, comprising the steps of:

(a) increasing a torque capacity of the on-coming input clutch and decreasing a torque capacity of the off-going input clutch;

(b) determining at frequent intervals a current acceleration of the output;

(c) determining a desired clutch torque of the on-coming input clutch using the current acceleration of the output; and (d) adjusting the on-coming input clutch to produce the desired clutch torque.

20. The method of claim 19 wherein step (b) further comprises the steps of:

determining a difference in the acceleration of the output between two of the intervals;

performing step (c) if said difference in the acceleration of the output is equal to or greater than a reference change in acceleration of the output.

21. The method of claim 19 wherein determining the desired input clutch torque of step (c) further comprises the steps of:

determining a reference input clutch torque from the product of a first current acceleration of the output multiplied by an inertia of the vehicle; and multiplying the reference input clutch torque by a ratio formed by a second current acceleration of the output that occurs after the first current acceleration of the output divided by the first current output acceleration.

* * * * *